Sept. 27, 1960  H. M. MUNCHERYAN  2,953,921
TEMPERATURE-INDICATING DEVICE AND CLOSURE CAP
Filed June 24, 1957
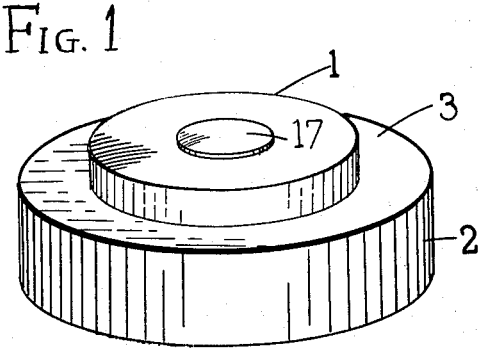
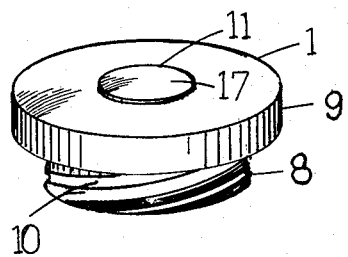
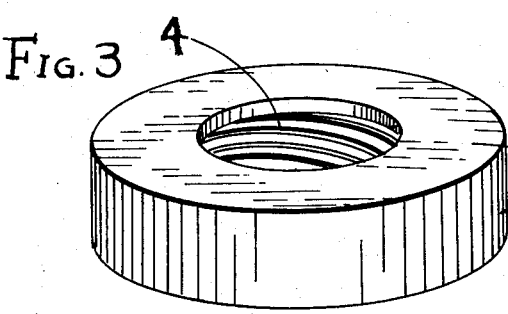
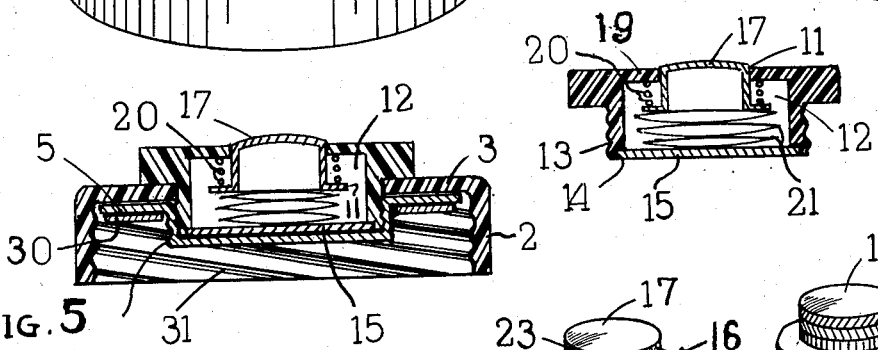
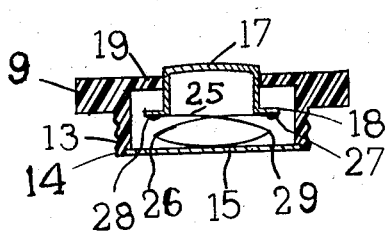
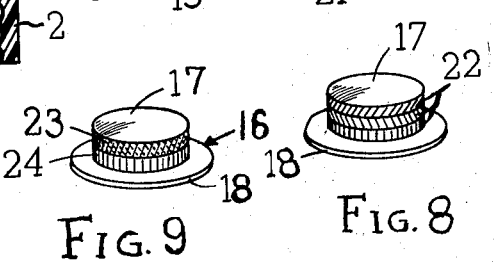
INVENTOR.
Hrand M. Muncheryan

United States Patent Office 2,953,921
Patented Sept. 27, 1960

2,953,921

TEMPERATURE-INDICATING DEVICE AND CLOSURE CAP

Hrand M. Muncheryan, 1418 Gary Place, Anaheim, Calif.

Filed June 24, 1957, Ser. No. 667,344

1 Claim. (Cl. 73—363.5)

The present invention relates to temperature-indicating devices and more particularly is concerned with a closure cap provided with a temperature indicator for use with baby-nursing milk bottles.

This invention is a modified embodiment of the temperature-indicating devices described and claimed in the applications filed by me in the United States Patent Office and now have become Patents No. 2,755,665 and No. 2,755,666, and is a pending application filed by me on April 23, 1953, Serial No. 350,626. In these patents and in the pending application, I have disclosed a conventional-type infant-nursing bottle cap containing a temperature-indicating device in which either a cylindrical or discal indicating element having a plurality of colored areas representing temperature conditions, and rotatively disposed behind a transparent window, indicates the temperature of the contents of the nursing bottle to which the cap is attached. Each color represents a specific temperature or range of temperatures. In the present invention, the temperature-indicating element moves up and down centrally to the cap, instead of rotation, by means of a thermostatic metal, uncovering different colored areas in correspondence with change of temperature thereof.

A principal object of the present invention is the provision of a temperature indicator in the form of a flanged cylinder with one end closed and disposed centrally to the nursing bottle cap, said indicator having a plurality of circular bands painted consecutively with different colors on the periphery thereof to represent different conditions of temperature.

Another object of the invention is to provide a thermo-sensitive means to actuate said indicator with changes of temperature in the contents of the bottle to which the cap with the indicator is attached.

Another object of the invention is to provide the bottle cap with a circular plate having a sealing gasket thereunder and means centrally of said plate to detachably secure the temperature indicator in the bottle cap so that the cap may be used with said plate to seal the bottle with or without the temperature indicator attached thereon.

A further object of the invention is to provide a temperature-indicating device which can be removed from or attached to the cap without removing the cap and without breaking the seal of the bottle.

Other objects and advantages of my invention will be best understood from a consideration of the following specification taken in conjunction with the accompanying drawings forming part thereof, and in which:

Figure 1 is a plan view of the bottle cap with the temperature-indicating device constructed in accordance with the principle of my invention.

Figure 2 is a view in elevation of the temperature indicator, showing a portion with peripheral threads for attachment to the cap assembly.

Figure 3 is a view of the cap with a central aperture through which the threaded portion of the temperature indicator member is inserted for attachment to the circular plate.

Figure 4 is the plan view of the cap-sealing circular plate with a central cup-shaped section threaded for engagement with the threaded portion of the temperature indicator.

Figure 5 is a detail sectional view of the cap with the temperature-indicating device shown in Figure 1.

Figure 6 is a sectional view of the temperature indicator to show additional details.

Figure 7 is a sectional view of the temperature indicator with a modified thermosensitive element arrangement.

Figure 8 is the plan view of the temperature-indicating element, and

Figure 9 is the plan view of a modified form of the temperature-indicating element.

Referring to the drawing, the device consists of a temperature-indicating member 1, an indicator housing 2 made in the form of an annulus or cylinder having an internal flange 3 with an aperture 4 centrally disposed thereof, and a circular plate 5 in abutment with flange 3 and containing a cup-shaped portion 6 threaded at 7 to engagedly receive the threaded section 8 of the temperature-indicating member 1. The cap and the indicator may be made of plastic or metal as desired. The circular plate 5 with its cup-shaped portion is preferably made of metal of good thermal conductivity, such as aluminum; it is formed by stamping from sheet metal.

The temperature-indicating member 1 may be made of metal but I prefer to use plastic such as Bakelite, polyethylene, nylon or any other suitable material. This member is made in the form of a cylindrical plug having a flanged section 9 and a reduced body section 10 which contains the external threads 8. Centrally to the flange 9 of the plug is an aperture 11 which opens into a chamber 12 provided inside said plug member. The end 13 opposite to the flanged section 9 of the plug is recessed internally as at 14 to receive a discal plate 15 made of a thermally conductive material, such as aluminum, or brass.

A temperature-actuated indicating element 16, stamped from sheet metal or molded from plastic in the form of a cylinder with one end 17 closed and the other end 18 flanged, is disposed in chamber 12, with the closed end 17 protruding through the aperture 11. The flanged portion 18 is biased against the internally flanged portion 19 of the plug member by means of a spring member 20. The opposite surface of the flanged section 18 is in contact with a thermo-sensitive element 21 made of a plurality of concave strips of a thermostatic metal with their concave surfaces oppositely placed and their ends preferably welded together. The thermostatic strips have natural resiliency, and the spring force is so chosen as to balance this resilience. When the temperature on the strips rises, they become more concave and push against the flange 18 of the indicator element 16 and raise it so that it protrudes through the aperture 11. When the temperature falls, the thermosensitive element flattens, and the spring 20 moves element 16 down; thus a thermally actuated reciprocating action is obtained.

The indicator element 16 is provided with a plurality of colored bands 22 peripherally thereof. These colored bands may be painted, printed, or affixed thereon by a suitable method. These colors may be blue, yellow, and red; the blue being at the top corresponding to cold temperature and may stand for a temperature range of 65 to 85° F. The yellow may cover a temperature of 85 to 105° F. which is the favorable temperature for baby-nursing milk. The red band corresponds to a temperature beyond 105° F., and is too hot a range to be safe for baby-nursing milk. Any other suitable color or insignia can be used. Thus, the higher the temperature, the more the indicator element will protrude through the aperture 11 and different temperature-defining areas will be uncovered to indicate relative temperature. The embodiment shown in Figure 9 contains only two bands, one a yellow band 23 and a red band 24, since it is not essential to indicate a cold temperature, in this case, the contents of the bottle would be indicated either as at normal temperature (yellow) or as hot (not favorable for baby-nursing). It should be noted that the red band in either of the embodiments shown in Figures 8 or 9 can be made wider so as to compensate for the area covered by the thickness of the internal flange 19, although this requirement has not been shown in either of these embodiments.

In Figure 7, the thermosensitive element 25 is a strip of bimetal bent into the form shown in the figure and welded or suitably secured at its ends to the flange 18 as at points 26 and 27. At the position shown, the temperature-indicating element indicates relatively cold temperature, since the closed end 17 is almost flush with the flange 19. When the temperature rises, the strip 25 assumes a more convex shape so that its bent corners 28 and 29 come closer and the element 16 moves up in proportion to the temperature rise, indicating the relative temperature.

To integrate the indicator-cap assembly, the plate 5 with the cup-shaped portion 6 is inserted into the housing 2 so that the upper surface of plate 5 is in abutment with the internal surface of flange 3. The temperature-indicating member 1 is inserted through the aperture 11 and screwed to the cup-shaped section 6 of plate 5, as sectionally shown in Figure 5. The plate 5 may be provided with a gasket 30 whereby when the indicator-cap assembly is mounted on a nursing milk bottle by screw engagement of threads 31, the gasket 30 provides an effective seal between the bottle and the cap.

Although a preferred embodiment of my invention is shown and described, the invention is susceptible to further modifications in the detail of construction without departing from the spirit and scope thereof.

I claim:

A temperature-indicating device and closure cap, comprising an annular housing provided with an apertured closure at one end and adapted to be secured on a baby-nursing milk bottle, a thermoconductive circular plate having a centrally recessed portion with engagement means provided thereon being disposed within said annular housing in abutment therewith, said circular plate having an annular gasket secured thereunder to seal said annular housing when engaged on said milk bottle, and a cylindrical plug having a temperature indicator disposed in the apertured portion of said closure and secured to said circular plate by said engagement means; said temperature indicator comprising a cylindrical body member with one end having an internal flange providing an aperture therein and at the other end having an internal recess and a discal member secured thereto, a cap-shaped temperature-indicating element flanged at its open end being positioned within said chamber with said cap-shaped portion protruding through said aperture of said cylindrical body member, a thermosensitive element confined within said chamber between said discal member and the flanged end of said indicating element and secured thereto, resilient means to bias said flanged end against said thermosensitive element so as to form a reciprocating motion under changes of temperature to indicate the temperature condition of the contents of said milk bottle.

References Cited in the file of this patent

UNITED STATES PATENTS

| 1,372,554 | Sahlin | Mar. 22, 1921 |
| 1,466,070 | Todd | Aug. 28, 1923 |
| 1,493,318 | Braun | May 6, 1924 |
| 1,579,652 | Detwiler | Apr. 6, 1926 |
| 1,807,752 | Poster | June 2, 1931 |
| 1,809,525 | Moran | June 9, 1931 |
| 2,736,604 | Albright | Feb. 28, 1956 |
| 2,866,338 | Muncheryan | Dec. 30, 1958 |

FOREIGN PATENTS

| 413,619 | Great Britain | Oct. 10, 1932 |